Feb. 15, 1949.    H. M. HUGE    2,461,547
TELEPHONE RINGING CURRENT GENERATOR
Filed Oct. 13, 1947    3 Sheets-Sheet 1

INVENTOR.
HENRY M. HUGE
BY Woodling and Krost
ATTORNEYS

Feb. 15, 1949.   H. M. HUGE   2,461,547
TELEPHONE RINGING CURRENT GENERATOR
Filed Oct. 13, 1947   3 Sheets-Sheet 2

INVENTOR.
HENRY M. HUGE
BY Woodling and Krost
ATTORNEYS.

Feb. 15, 1949.  H. M. HUGE  2,461,547
TELEPHONE RINGING CURRENT GENERATOR
Filed Oct. 13, 1947  3 Sheets-Sheet 3

INVENTOR.
HENRY M. HUGE
BY Woodling and Krost
ATTORNEYS.

Patented Feb. 15, 1949

2,461,547

UNITED STATES PATENT OFFICE 2,461,547

TELEPHONE RINGING CURRENT GENERATOR

Henry M. Huge, Lorain, Ohio, assignor to Lorain Products Corporation, a corporation of Ohio Application October 13, 1947, Serial No. 779,516

14 Claims. (Cl. 172—281)

This invention deals with telephone ringing-current generators and in particular with a generating system for use in frequency selective ringing by means of bells tuned to the several frequencies. The ringing-current generator of my invention provides four or more output frequencies, each of which may be used to ring bells tuned to that frequency without ringing those tuned to any of the other frequencies.

The ringing-current generators previously used for this type of service have utilized either vibratory converters or rotary generators. The vibratory converters have the particular disadvantage of requiring frequent maintenance and of having a tendency to shift their frequency with wear of the contacts. Any change in frequency away from the nominal frequency reduces the sensitivity of the bells tuned to the nominal frequency, and increases the possibility of cross-ringing the bells tuned to other frequencies. The rotary type of generator has several disadvantages, one of which arises from the fact that the frequencies to be generated are low, because of this fact, the size of the machine must be considerably greater than might be anticipated. It is also necessary to reduce the speed of a rotary machine to provide a common denominator for all of the ringing frequencies to be used so that the generators can all be mounted on one shaft. Otherwise the various frequencies must be obtained through the use of gear-driven generators running at the proper speed. Furthermore, the speed of a rotary machine must be held constant, either through the use of a synchronous driving motor having a large number of poles to provide the required speed, or by means of a sensitive governor system to regulate the speed of a D. C. driving motor. All of these provisions add to the size and cost of the rotary equipment without eliminating the inherent maintenance problems of all rotating machinery.

My invention overcomes these difficulties and provides output frequencies which are stabilized by the incoming alternating current supply, eliminating the need for vibrating contacts, rotating equipment, governors, or other expendable components. My invention makes use of magnetic frequency changers, utilizing saturated magnetic cores and condensers in a novel circuit arrangement which insures complete stability of the output frequencies, regardless of the load conditions and regardless of other variables in the operation of the device.

My invention depends for its operation on the combination of several different types of magnetic frequency changers in a single converter, combined in a manner which eliminates the possibility of false operation, particularly with regard to the possibility of a change in frequency of any one of the output frequencies.

By my invention I am able to provide four or more frequencies such as are required for selective ringing on telephone lines provided with tuned bells. The four frequencies are obtained from the A. C. supply frequency by means of magnetic frequency changers having no moving parts. Thus, my ringing-current generator substantially eliminates the need for ringing generator maintenance which heretofore has been one of the disadvantages of frequency-selective ringing.

It is an object of my invention to generate with a static frequency changing system, four or more frequencies for use as selective telephone ringing frequencies.

Another object of my invention is to obtain frequencies other than subharmonics of the energizing frequency, by means of static frequency converters.

Another object of my invention is to obtain an output frequency equal to ⅝ of the input frequency by means of a magnetic frequency changer.

Still another object of my invention is to combine two frequencies in a magnetic modulator to obtain an output frequency equal to the sum of the two input frequencies.

Another object of my invention is to energize a magnetic modulator with two input frequencies and to obtain an output frequency equal to the sum of the two input frequencies, and to substantially eliminate undesired frequency components from the output frequency.

Another object of my invention is to provide a balanced magnetic modulating system in which undesired frequencies are eliminated from the output by cancellation rather than by filtering.

Still another object of my invention is to combine a magnetic frequency multiplier with a magnetic frequency divider to obtain an output frequency which is a multiple of a subharmonic of the input frequency.

Another object of my invention is to generate a set of ringing frequencies by means of magnetic frequency changers and to maintain a regulated output voltage at each one of the frequencies.

Other objects and a better understanding of my invention will be obtained from the following specifications and claims in connection with the accompanying drawing in which:

Figure 1:
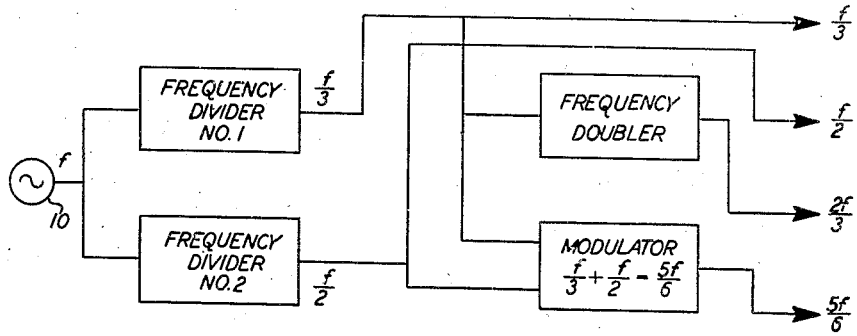
Figure 1 is a block diagram of an embodiment of my invention adapted to supply four separate ringing frequencies from a single alternating current input frequency.

The adaptation of a static frequency changing system to the production of the necessary frequencies for use with a four or five-frequency telephone ringing system has not been successful heretofore, chiefly because the magnetic frequency changers known were suited to the production of subharmonics of the input frequency, that is one-half, one-third, one-fourth, etc. of the input frequency.

Although magnetic frequency changers were known which were capable of producing frequencies other than the subharmonics of the input frequency, these frequency changers were, in general, not as reliable, as stable in operation, or as efficient as the frequency dividers. Furthermore, frequency selective telephone ringing systems generally require a set of frequencies separated from each other by uniform intervals. In the static frequency changers of the prior art, no such set of frequencies was available except through the use of frequency changers utilizing the Heegner principle of operation as disclosed in U. S. Patent No. 1,656,195 issued January 17, 1928. The Heegner oscillator depends for its operation on the fact that in a magnetic modulator of the type used, the introduction of resistance (or losses) at one of the frequencies of the modulation product produces negative resistance at another one of the frequencies.

In the Heegner oscillator, the circuit oscillates at two frequencies each of which bears this relation to the other, so that resistance at either one of the frequencies of oscillation is reflected through the modulator as negative resistance at the other frequency of oscillation and as positive resistance at the input frequency. The two frequencies are therefore termed "mutually self-exciting." The two frequencies of oscillation thus produced are not necessarily rational fractions of the driving frequency. Although the Heegner oscillator is capable of producing any desired output frequency, nevertheless, it is unsuited for use as a telephone ringing generator, because the output frequencies are determined by the resistances and reactances in the circuit. Therefore, when a load is applied, the output frequency shifts and at the same time the second frequency of oscillation also shifts, so that their relationship to each other which makes them mutually self-exciting is maintained, but the output frequency is dependent upon the load condition. Obviously this type of system would be no better than the vibratory converter arrangements or rotary converters which have the disadvantages previously enumerated.

By my invention I am able to overcome this difficulty and am able to utilize magnetic frequency changers for the production of a set of frequencies which can be used as telephone ringing frequencies, and at the same time eliminate any possibility of a shift in frequency occurring, whether dependent upon load resistance or load power factor. In the circuits of my invention the output frequencies are related to the input frequency by a definite ratio, and this ratio is maintained under all conditions which permit the circuit to oscillate. Under extreme conditions of overload or of variations in the A. C. supply voltage, the output frequencies of my ringing generator do not shift, but rather they will stop completely without changing their frequency.

I achieved this high degree of stability by the combination of two or more frequency reducers energized from the same alternating current source. The two frequency reducers divide the frequency of the source by different integers so that two output frequencies are obtained. The outputs of these two frequency reducers are then fed into a magnetic modulator circuit of novel construction which combines the two frequencies to produce a third frequency which is not a subharmonic of the input frequency. The output frequency of the modulator is determined solely by the input frequencies and not by any condition of reactance or resistance in its load circuit; therefore, the ringing frequency supplied does not vary in operation. Other output frequencies are obtained by multiplication or division of the frequencies supplied by the two frequency dividers, or by modulation of one of these frequencies with the source frequency or with any one of the others.

Figure 1 shows a block diagram of an embodiment of my invention utilizing the principles just outlined. The lines connecting the blocks are lines designating the flow of power and may comprise two or more electrical conductors. The arrows indicate the output and each may comprise at least two spaced terminals which supplies an output voltage of the indicated frequency, and which is shown in more detail in the other views. In Figure 1 the alternating current source 10 supplies an output frequency $f$ which is supplied to the frequency divider No. 1 and to the frequency divider No. 2. In the embodiment shown in the diagram, the frequency divider No. 1 divides the frequency by 3 and supplies an output frequency equal to $f/3$ whereas the frequency divider No. 2 divides the input frequency by 2 and supplies an output frequency equal to $f/2$.

These two frequencies are two of the ringing frequencies which are used. A third frequency is obtained from the frequency divider No. 1 by means of a frequency doubler, which when supplied with the frequency $f/3$, gives an output frequency equal to $2f/3$.

A fourth output frequency is obtained from a magnetic modulator which is energized from the outputs of the two frequency dividers. The modulator adds these two frequencies together and supplies an output frequency equal to $5f/6$. If a fifth ringing frequency is required it can be obtained directly from the source 10 as the frequency $f$. It will be noted that the five frequencies thus obtained are separated from each other by intervals of $f/6$. This arrangement therefore provides ringing frequencies which are separated from each other by uniform intervals and which are positively stabilized as to frequency by the stability of the driving source 10.

In the following figures the individual components shown in the block diagram of Figure 1 are described in further detail.

Figure 2:
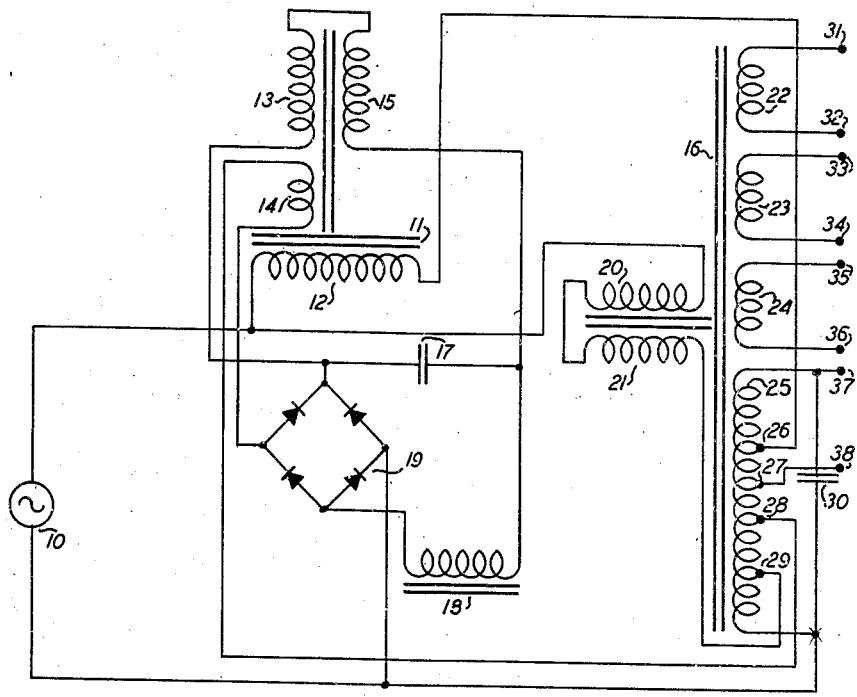
Figure 2 is the schematic diagram of an arrangement which may be used for the frequency divider No. 1 shown in Figure 1.

The circuit of Figure 2 is that of a frequency divider adapted to supply an output frequency equal to ⅓ of the input frequency and therefore adaptable to be used as the frequency divider No. 1 in Figure 1.

The arrangement shown in Figure 2 is a frequency divider which requires no starting transient. This device is shown and described in detail in my U. S. patent application, Serial Number 740,149 filed April 8, 1947.

The circuit of Figure 2 comprises the three-legged saturable magnetic core, designated symbolically by the T-shaped figure 16, in which the cross-bar of the T symbolizes the central core member and the stem of the T symbolizes the two outside legs on which are wound respectively the windings 20 and 21. The winding 25 on the central core member, has capacitor 30 connected across it. The windings 20 and 21 on the two outside legs of the core are energized from the source 10 in series with a portion of the winding 25 terminated at tap 28. This portion of the circuit comprises a common-core frequency reducer which is capable of sustaining oscillations of ⅓ the energizing frequency if the oscillations are once started.

The oscillations in Figure 2 are started by the cooperation of the second three-legged saturable reactor 11, the capacitor 17, the rectifier bridge 19 and the inductance 18 with the elements of the common-core frequency reducer.

The three-legged saturable reactor 11 is designated by a T-shaped figure in which as previously mentioned, the cross-bar designates the central core member and the stem designates the two outer core members, on one of which the windings 13 and 14 are wound, and on the other one of which is wound the winding 15. Winding 12 on the central core member is connected from one side of the source 10 to tap 26 on winding 25. The windings 13 and 15 are connected in series with each other in a closed circuit including capacitor 17. The rectifier bridge 19 which is energized by winding 14 and by a portion of winding 25 terminated at tap 29 supplies direct current through the windings 13 and 15 by way of the inductance 18. In this arrangement, a frequency of ⅓ the frequency of source 10 circulating through capacitor 30 is mutually self-exciting with a frequency of ⅔ the frequency of source 10 circulating through capacitor 17. The term "mutually self-exciting" is used to indicate the type of action which occurs in the Heegner oscillator previously mentioned, in which a modulating action occurs through which the two side frequencies which are produced are mutually self-exciting. That is to say, the resistance introduced in the circuit at the one side frequency is reflected through the modulator as negative resistance at the other side frequency and vice versa so that each frequency aids in the excitation of the other. This modulating action in the circuit of Figure 2 is accomplished through the saturation of the three-legged reactor 11. The oscillations thus started are sustained by the cooperation of the saturable three-legged reactor 16 with the capacitor 30, and the output frequency, which is equal to ⅓ the frequency of source 10, appears across the output windings 22, 23, 24 and 25.

The winding 25 is also provided with a tap 27 so that a suitable output voltage can be obtained from this winding across the output terminals 37 and 38.

The other output windings 22, 23 and 24 are provided respectively with terminals 31 and 32; 33 and 34; 35 and 36. The output winding 22 is used as a ringing current supply for the provision of the frequency f/3. The other output terminals are used for supplying the other portions of the frequency changer which will be described in the subsequent description.

Figure 3:
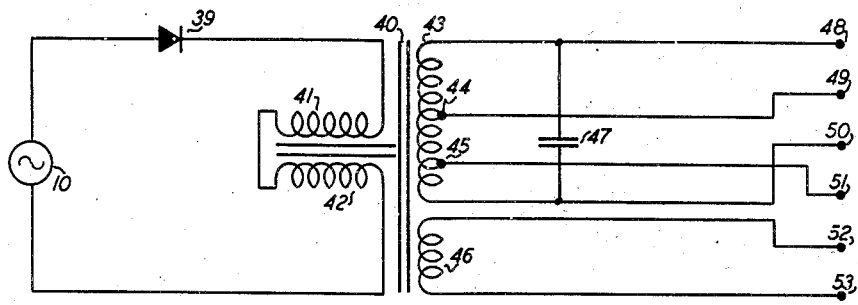
Figure 3 is the schematic diagram of a frequency changer which may be used for the frequency divider No. 2 in Figure 1.

The circuit diagram shown in Figure 3 is that of a frequency divider which may be used as the frequency divider No. 2 in Figure 1, since it is particularly adapted to supply an output frequency equal to ½ of the input frequency. The circuit of Figure 3 comprises a saturable three-legged reactor designated symbolically by the T-shaped figure 40 with the windings 41 and 42 on the two outer core members and the winding 43 on the central core member. The windings 41 and 42 are connected in series with each other and are energized from the source 10 through the half-wave rectifier 39. The two windings 41 and 42 are substantially alike and are polarized to produce opposing fluxes in the central core member, so that a conjugate relationship is established between the input circuit comprising windings 41 and 42 and the output circuit including winding 43 on the central core member. Coupling is obtained between the input and output branches of the circuit in spite of the conjugate relationship, because of the action of capacitor 47 which supplies exciting current for the entire winding 43. Any current which flows through the winding 43 tends to increase the saturation of one of the outer legs of the core 40 and reduce the saturation of the other one of the outer legs, so that the voltage from source 10 divides unequally between the windings 41 and 42 under this condition and energy is transferred to the winding 43 and in turn to the capacitor 47.

The circuit elements are proportioned to provide a regenerative condition, so that oscillations of one-half the frequency of source 10 are produced in the circuit of capacitor 47 through the cooperation of the saturable reactor 40 with the rectifier 39 and the condenser 47. The rectifier 39 provides a biasing flux for the core which cooperates in the establishment of the regenerative condition previously mentioned. This circuit is described more fully in my U. S. patent application, Serial No. 662,137 filed April 15, 1946 and entitled, "Frequency reducer."

The winding 43 is provided with a tap 45 which may be located to provide the desired ringing voltage which is then obtained at output terminals 50 and 51. The terminals 48 and 50 which are connected to the winding 43 are also used in the operation of the modulator which will be described later. The winding 43 is provided with a center tap 44 brought out to terminal 49 which is also used in the operation of the modulator. The insulated winding 46 is brought out to terminals 52 and 53 for the provision of a low voltage of ½ the frequency of source 10. The purposes of these output terminals will be discussed further in connection with Figures 6 and 7.

Figure 4:
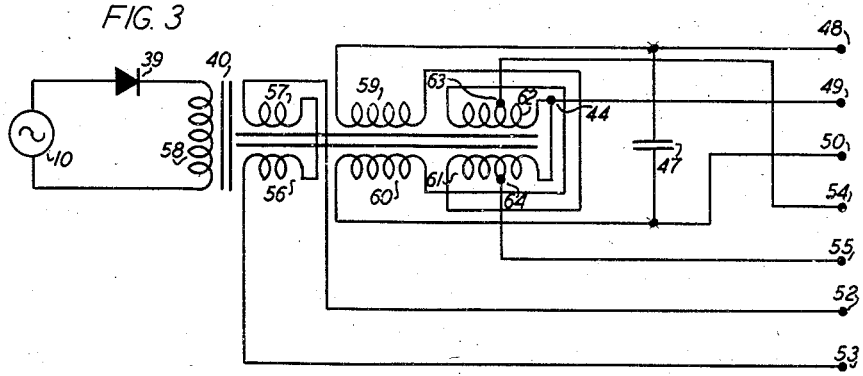
Figure 4 is a modification of the arrangement of Figure 3.

The device shown in Figure 4 is a modification of that shown in Figure 3, and comprises a half-wave rectifier 39 and a three-legged saturable magnetic core 40 as does Figure 3.

However, in Figure 4 the input winding 58 is on the central core member and the output windings 59, 60, 61 and 62 are on the outer core members. The relationship between the input and output branches is conjugate, as in Figure 3, as provided by the polarization of the windings on the outer legs of the core 40. The method of operation of the circuit of Figure 4 is essentially the same as that of Figure 3 inasmuch as the conjugate relationship between the input and output branches is established by the polarization of the windings, and the coupling between the input and output branches is provided by the flow of secondary current which produces an increase in saturation of one part of the core and a decrease in saturation of the other part of the core.

The chief difference between the circuit of Figure 3 and that of Figure 4 is in the method of energizing the output terminals, and in particular the center tap 44. In order to obtain essentially the same voltage between terminals 48 and 49 in Figure 4 as is obtained in Figure 3, it is necessary that this voltage comprise a voltage of ½ the frequency of source 10 in which substantially all of the voltage of the source frequency is balanced out. This is accomplished in Figure 4 by connecting winding 59 in series with winding 61 between terminals 48 and 49. On the other side of the center tap 44, the windings 62 and 60 are connected in series with each other between the terminals 49 and 50. The windings 59, 60, 61 and 62 are preferably all substantially alike so that equal voltages are produced in each winding, and the component of the frequency of source 10 is cancelled out of the voltage on each side of the center tap 44. The voltage across capacitor 47 is substantially the same as across the capacitor 47 in Figure 3. In Figure 3 the ringing voltage of ½ the source frequency is obtained across terminals 50 and 51 whereas in Figure 4 the ringing voltage is established at the proper level by the location of the taps 63 and 64 on the windings 61 and 62. These taps are connected to the output terminals 54 and 55 across which the output voltage appears. In Figure 4 the windings 56 and 57 connected in series take the place of the winding 46 in Figure 3, across which the voltage of ½ the frequency of source 10 appears. This voltage is obtained in Figure 4 across the terminals 52 and 53 as in Figure 3. The use of these terminals will be explained further in connection with Figures 6 and 7.

Figure 5:
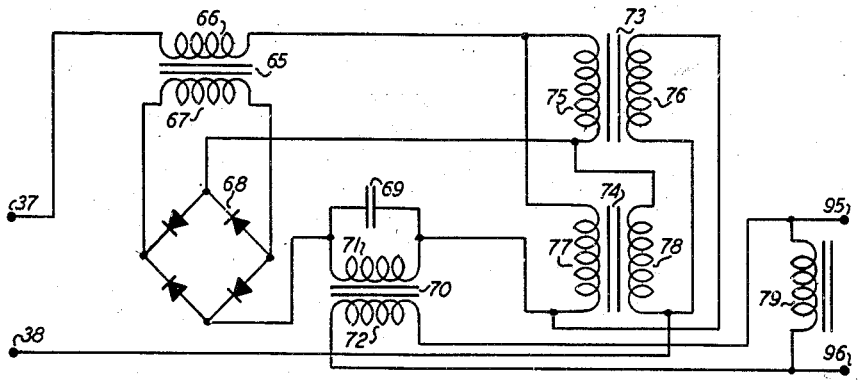
Figure 5 is a schematic diagram of a frequency doubler which may be used in the circuit of Figure 1.

Figure 5 is a circuit diagram of a frequency doubler which may be used in the ringing generator of Figure 1. The frequency doubler comprises the two saturable magnetic cores 73 and 74 upon which are respectively wound the windings 75 and 76; 77 and 78. These windings are connected in a bridge arrangement, that is, winding 75 is connected in series with winding 78 across the input terminals 37 and 38 and winding 77 is connected in series with winding 76 across the input terminals 37 and 38. The output terminals of the bridge then become the junctions between windings 75 and 78 and the junction between windings 77 and 76.

The terminals 37 and 38 are shown in Figure 2 in the frequency reducer No. 1, and they have a voltage of ⅓ the frequency of source 10 appearing across them. The frequency doubling action is accomplished by providing a unidirectional biasing current to magnetize the saturable cores 73 and 74. This biasing current is obtained from the full-wave rectifier bridge 68 which is energized from secondary winding 67 of the current transformer 65. The primary winding 66 of transformer 65 is connected in series with the input to the bridge from terminal 37.

The biasing current from the rectifier bridge 68 is applied to the output side of the bridge, through the inductance winding 71 on inductance 70. In this manner the combination of the biasing flux with the flux produced by the voltage supplied at terminals 37 and 38 cooperates to produce voltage of twice the frequency appearing across terminals 37 and 38 across the output side of the bridge. The method of energizing the biasing rectifier is an adaptation of the arrangement shown in Figures 7 and 8 of my U. S. patent entitled "Magnetic frequency multiplier," No. 2,395,389, issued February 26, 1946. This biasing arrangement has the advantage of providing a large biasing current when a heavy load is applied and of reducing the amount of biasing current as the load diminishes. A small no-load current drain is imposed on the driving source, while at the same time a large overload capacity is available when needed. The flow of current from the input terminals 37 and 38 through the windings in the bridge circuit aids the saturation of one of the cores during the half cycle that it opposes the saturation of the other core so that a coupling is produced between the input and output branches of this circuit. During the other half cycle the magnetization of the first core is opposed while that of the second core is aided, so that the division of primary voltage is opposite to what it was on the first half cycle and the resulting pulse of secondary voltage is in the same direction as the first one so the output frequency is equal to twice the input frequency.

The output voltage appears across the capacitor 69 and inductance winding 71. The capacitor 69 is proportioned to provide exciting current at the second harmonic frequency for the saturable cores 73 and 74 in order to obtain a maximum transfer of power. The inductance 70 is preferably constructed with an air gap in its core in order to avoid saturation by the direct current from the rectifier bridge 68. The output winding 72 on the inductance 70 is connected to the output terminals 80 and 81 across which the frequency equal to ⅔ the frequency of the source 10 is obtained.

The saturable inductance 79 connected across the output terminals 80 and 81 is used to stabilize the output voltage by saturating when the voltage reaches its normal value. Under this condition the saturation of the core causes an increased lagging current to flow through winding 79, counteracting part of the exciting current supplied by capacitor 69 to limit the rise in voltage to the desired value. As the voltage falls with load across terminals 80 and 81, the inductive current consumed by the inductance 79 is diminished, and the net effect of capacitor 69 is increased to provide an increased exciting current. A large overload capacity is thus provided, as explained in my U. S. Patent 2,395,389. It will be apparent that any one of a number of frequency doubler circuits known in the art could be used in this portion of my circuit with satisfactory results. Alternatively, the frequency doubler could be eliminated by the use of a frequency changer such as that shown in Figure 1 of my U. S. Patent 2,418,641, issued April 8, 1947. Such an arrangement generates both $f/3$ and $2f/3$ in a single frequency changer.

Figure 6:
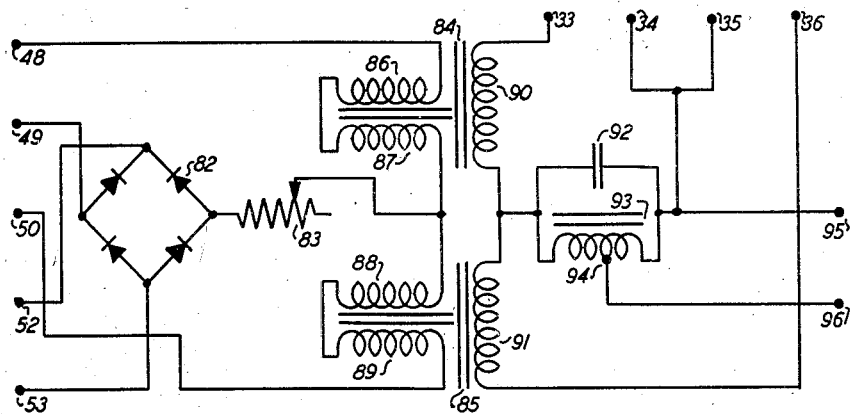
Figure 6 is the schematic diagram of a modulator which may be used in the diagram of Figure 1.

The circuit shown in Figure 6 is that of a magnetic modulator which can be used in the circuit of Figure 1 for the production of a fourth ringing frequency. This magnetic modulator employs a double-balanced construction which comprises at least two individual magnetic modulators of single-balanced construction in order to eliminate most of the undesired frequencies from the output by means of cancellation, in order to eliminate the need for filtering.

In the operation of a magnetic modulator, there are always a number of frequencies produced in addition to the desired output frequency. Among these are the two applied frequencies and their harmonics. When a biased-core modulator is used, both even and odd harmonics of the input frequencies are to be considered. At the same time, numerous modulation products other than the desired ones are produced.

In the operation of a magnetic modulator, these undesired frequencies usually represent a problem for filtering in the output circuit, so that they may be eliminated. In the operation of a modulator which is energized from frequency dividers or other sources having considerable internal impedance, these modulation products may modify the output voltages of the driving sources, and cause further difficulties both in the operation of the modulator and in the operation of the frequency dividers. Furthermore, when biasing current is used in a modulator, its effect on the driving generator must also be considered. In my invention I overcome all of these difficulties and substantially eliminate the effects of modulation products on the driving sources, and at the same time eliminate most of the undesired products from the output voltage without filtering out each of the undesired products. The method by which these results are obtained will be clarified by detailed description of Figure 6.

In Figure 6, two three-legged saturable magnetic cores are used, designated by the T-shaped figures 84 and 85. Each of the cores is utilized in a balanced magnetic modulator and the combination of the two single-balanced magnetic modulators comprises a double-balanced magnetic modulator. As in the previous figures, the cross-bar of the T indicates the central core member of the three-legged reactor and the stem of the T indicates the two outside core members. Thus, on the core 84 the winding 86 is on the one outside leg and the winding 87 is on the other outside leg of the core 84, and winding 90 is on the central leg of the core. On the core 85, the windings 88 and 89 are on the outer core members and the winding 91 is on the central core member.

The left-hand side of the circuit of Figure 6 is energized from the frequency divider No. 2 by means of the terminals 48, 49 and 50 as shown in Figures 3 and 4. The rectifier bridge 82 is also energized from the frequency divider No. 2 by means of the terminals 52 and 53 which supply a voltage of ½ the frequency of source 10 to the rectifier bridge. The purpose of this method of energization of the rectifier bridge 82 is to obtain a constant voltage across this rectifier. Inasmuch as the circuits shown in Figures 3 and 4 both have the characteristic of supplying a constant output voltage regardless of the variations of the input voltage and regardless of load variations within the capacity of the converter, the voltage supplied to rectifier bridge 82 is maintained substantially constant at all times. The rectifier bridge 82 is connected to the center tap 49 on the one side, and to the junction between windings 87 and 88 on the other side, through the resistor 83. The adjustable resistor 83 is used to adjust the value of biasing current to the desired value. It may also serve to minimize the effects of temperature changes in the windings 86, 87 and 88 and 89 if the resistance 83 is greater than the resistances of the windings or if it has an opposite temperature coefficient. When the correct output voltage is obtained from rectifier 82, the resistor 83 may be omitted.

It will be seen that the direct current from the rectifier bridge 82 flowing through the terminal 49 to the windings of the frequency divider No. 2 as shown in either Figure 3 or Figure 4 will have substantially no effect upon the action of these frequency dividers, because of the center tap construction which provides two paths for the direct current. The current flowing through the one path substantially cancels the effect of the current flowing through the other path.

In Figure 6 it will be seen that in the double-balanced modulator the polarity of the biasing current with respect to the current from frequency divider No. 2 is reversed between the reactors 84 and 85; that is to say, the polarity of the bias with respect to the frequency equal to ½ the source frequency is the same in windings 86 and 87 and is the same in windings 88 and 89 but opposite to that in windings 86 and 87. The windings 86 and 87 are polarized to produce opposing fluxes in the central member of the core 84, so that a conjugate relationship is established between the windings 86 and 87 and the winding 90 on the central core member. A conjugate relationship is likewise established between the windings 88 and 89 and the winding 91 on the core 85. Therefore, when a current flows through winding 90, it has opposing effects on the windings 86 and 87, that is to say, if the current is in such a direction as to increase the saturation of the core member bearing winding 86, then it will decrease the saturation of the core member bearing winding 87. Similarly, a current flowing through winding 91 which tends to increase the saturation of the core member bearing winding 88 will tend to decrease the saturation of the core member bearing winding 89.

The windings 90 and 91 are connected in series with each other and are energized from terminals 33 and 36 of the frequency divider No. 1 shown in Figure 2. The terminals 34 and 35 shown in Figure 2 are connected together to provide a center tap which is connected to the junction between windings 90 and 91 through the parallel circuit comprising inductance 93 and capacitor 92. The desired modulation product is obtained across the inductance 93, and it is provided with a tap 94 in order that the desired output voltage may be obtained across terminals 95 and 96. It will be noted that the frequency applied across terminals 33 and 36 is cancelled out of the inductance 93 by the balanced arrangement. Likewise, the frequency applied across terminals 48, 49 and 50 is cancelled out by the single-balanced modulators individually, so, of course, it will not appear in the output voltage either. Similarly, most of the undesired modulation products produced by orders of modulation other than that for which the circuit is intended, and which are not cancelled out of a single-balanced modulator, are also cancelled by the double-balanced construction of my magnetic modulator. Likewise, the products of modulation are, for the most part, cancelled out of the driving generators. Thus, the output frequency is cancelled out of the frequency divider No. 1 in the same manner that the biasing current is cancelled out of the frequency divider No. 2. A frequency equal to twice the output frequency and another frequency equal to twice that of the frequency divider No. 1 both appear in the windings 86 and 87, but these frequencies also appear in the windings 88 and 89 in the opposite phase, so that the effect of these frequencies on the frequency divider No. 2 through terminals 48, 49 and 50 is cancelled out as previously explained.

My modulator has the further advantage in that it requires no filters producing a sinusoidal current wave shape in the energizing circuit as is usually required for magnetic modulators. In my modulator, the output voltage of the frequency divider is applied directly to the windings of the modulator without any intermediate filters or wave shaping devices. By the elimination of these various circuit components and by the elimination of the need for filtering numerous undesired frequencies out of the output frequency, the efficiency of conversion of my modulator is greatly increased above that heretofore obtained with magnetic modulators. In general, the production of undesired frequencies usually meant that some of the power was dissipated in these frequencies in the various circuit elements, and the efficiency was consequently poor.

In the operation of my modulator as shown in Figure 6, the only frequency of any consequence which must be filtered out is the lower side frequency. In the operation of the modulator, the upper side frequency comprising the sum of the two driving frequencies, is the desired frequency. The lower side frequency, which is the difference between the two driving frequencies, also appears in the output circuit. In the example in question, the upper side frequency is equal to ⅚ the frequency of source 10 and the lower side frequency equal to the difference between the two driving frequencies, is equal to ⅙ the frequency of source 10. There is, therefore, a ratio of 5 to 1 between the two frequencies which must be separated, and the simple parallel circuit consisting of capacitor 92 and inductance 93, approximately resonant to the output frequency, is adequate for the elimination of the lower side frequency.

Although the term resonant has been used here, the actual tuning of the circuit is by no means critical, because of the wide separation between the upper and lower frequencies. In fact, I have found that the inductance 93 may be operated at a very high flux density so that it exhibits non-linear characteristics at the normal output voltage in order to regulate the output voltage. Although this causes the circuit to depart from the resonant condition which might be obtained with the inductance 93 unsaturated, nevertheless, I have found that adequate separation of the frequencies is obtained, providing a smooth output voltage wave across terminals 95 and 96 even when the inductance 93 is operated at a high flux density. The desired characteristic of inductance 93 is best obtained by providing its core with a small air gap, so that at low flux densities it acts as a linear inductance but at high flux densities saturation is possible, and a non-linear characteristic may be obtained. The action of this circuit depends on the internal inductive reactance of the modulator. The capacitor 92 in drawing capacitive current from the modulator therefore tends to cause the output voltage of the modulator to rise. If this rise were not limited by the saturation of the inductance 93, a relatively high voltage would be obtained at no-load, and a considerably lower voltage at normal load across terminals 95 and 96. In order to obtain a rather closely regulated output voltage, the construction of the inductance 93 as described is highly desirable. Thus, as the voltage rises and the inductance 93 begins to saturate, its exciting current increases and reduces the effect of capacitor 92 so that the voltage is held at the desired level. Because the core 93 is provided with an air gap in its circuit, this non-linear operation results in very little, if any, distortion of the output voltage wave.

The voltage produced by the modulator at the lower frequency of modulation, that is the lower side frequency, is considerably lower than that produced at the higher frequency, so that even without filtering, a fairly good wave is obtained. By the use of capacitor 96, which tends to further increase the voltage at the desired frequency, and the use of inductance 93, which provides a low impedance path for the low frequency, the lower side frequency is substantially eliminated from the output voltage.

The double-balancing action of my modulator will be better understood by a somewhat more detailed discussion of the voltages in the various windings. As previously mentioned, there are three magnetizing components impressed on the saturable cores of the modulator. The first component is the unidirectional current, the second component the current from the frequency divider No. 1, and the third component the current from the frequency divider No. 2.

In the modulator shown in Figure 6, there are four saturable magnetic flux paths, associated respectively with the windings 86, 87, 88 and 89. Each of these flux paths is magnetized by the three magnetizing components, the first being the unidirectional component and the other two the two modulating frequencies. In the three-legged reactors, the winding on the central core member magnetizes both of the flux paths in the reactor, each flux path including one of the outside legs. As compared with the magnetizing effects of the windings on the outside legs, the effect of the winding on the central leg reverses between the two windings as previously explained. If the effects of both outside coils, for example coils 86 and 87, are considered positive, then the effect of the central coil, for example winding 90, is positive in one path and negative in the other. Bearing this relationship in mind, the polarities of the components in the four flux paths may be established as follows: In the first flux path all three of the magnetizing components are positive, in the second flux path the first and third are positive and the second negative, in the third flux path the first is negative and the second and third positive, and in the fourth flux path the first and second are negatibe and the third positive. The desired modulation components reverse in sign with a reversal of any one of the components, whereas the undesired modulation products which represent a different order of modulation, appear in a polarity which is in general independent of the polarity of at least one of the magnetizing components. These undesired components are therefore cancelled out of the output which is obtained by a summation of the desired modulation products and therefore a cancellation of the undesired modulation products. The presence of both the sum and difference frequencies in the output circuit has already been discussed, these are both derived from the same order of modulation and, therefore are classed as desired frequencies even though the difference frequency is eliminated from the output by the selectivity of the parallel circuit consisting of capacitor 92 and inductance 93.

Figure 7:
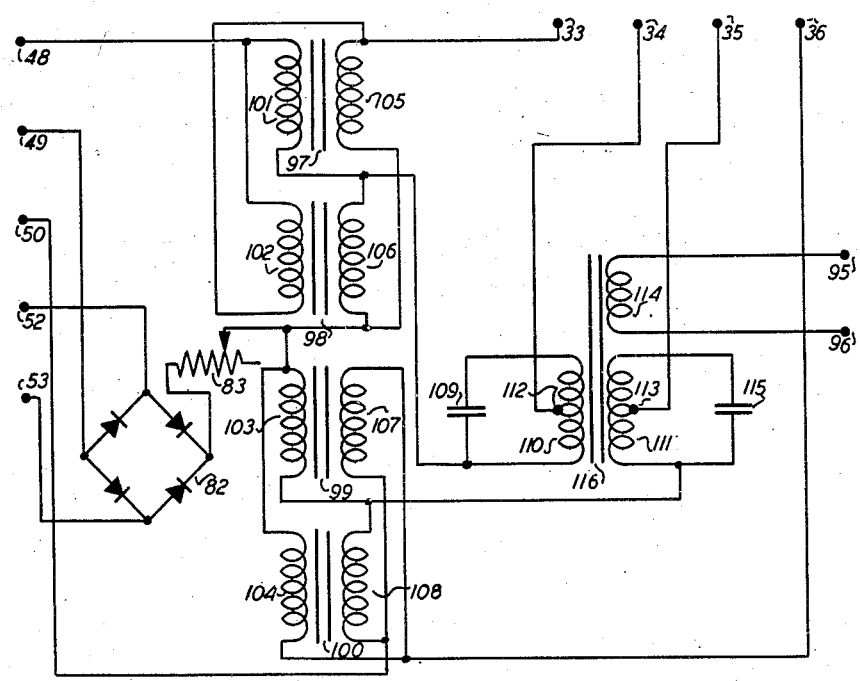
Figure 7 is another type of modulator which may be used in the embodiment of my invention diagrammed in Figure 1.

The circuit shown in Figure 7 is also that of a double-balanced modulator arrangement as shown in Figure 6 except that the circuit of Figure 7 utilizes two bridge-connected modulators instead of the two three-legged core modulators used in the circuit of Figure 6. There are two bridges in Figure 7, each of which may be considered as an individual modulator. The first bridge-connected modulator utilizes the saturable cores 97 and 98 and the second utilizes the saturable cores 99 and 100. Winding 101 on core 97 is connected in series with winding 106 on core 98 and winding 102 on core 98 is connected in series with winding 105 on core 97, the input terminals of the bridge being the junction between windings 101 and 102 and the junction between windings 105 and 106, whereas the output terminals of the bridge are the junction between windings 102 and 105 and the junction between windings 101 and 106.

The windings 103, 104, 107 and 108 on the cores 99 and 100 are connected in similar fashion so that the output terminals of the second bridge are the junction between windings 103 and 108 and the junction between windings 104 and 107. One of the chief differences between the circuit of Figure 6 and that of Figure 7 arises from the fact that the input and output sides of the individual modulators in Figure 7 are not insulated from each other as is true in Figure 6. It, therefore, becomes necessary when applying the second energizing frequency, which in this case is the output of the frequency divider No. 1, to separate the energization of the two bridges on the right hand side of the circuit in order to avoid undesirable electrical connections between the output sides of the first and second bridges. This is accomplished through the provision of the two output windings 23 and 24 shown in Figure 2 for the energization of the double-balanced modulator shown in Figure 7. These windings are brought out to terminals 33 and 34 and terminals 35 and 36. The terminals 33 and 34 are used to energize the upper bridge in Figure 7 and the terminals 35 and 36 are used to energize the lower bridge in Figure 7.

The summation of the desired components of the modulation products is accomplished through the use of the separate windings 110 and 111 on the inductance 116. The word "inductance" as used here, is used to indicate that the function of the unit depends upon its exciting current and does not necessarily mean that the windings of the inductance cannot provide a transformer action. A transformer action is in fact obtained through the use of the windings 110 and 111 which are polarized to provide summation of the desired modulation products and cancellation of the undesired products. The winding 110 is shunted by capacitor 109 and the winding 111 is shunted by capacitor 115. These capacitors take the place of the capacitor 92 in Figure 6 and serve to provide a relatively high impedance in this branch of the circuit at the desired output frequency.

In order to operate the capacitors 109 and 115 at a higher voltage than the normal circuit voltage and thereby economize on the size of the capacitors, the windings 110 and 111 are provided with taps 112 and 113 respectively, through which the energizing leads from terminals 34 and 35 are connected. The inductance 116 is provided with an insulated output winding 114 terminated at output terminals 95 and 96 from which the desired ringing frequency may be obtained. The circuit which couples the arrangement of Figure 7 to the frequency divider No. 2 is essentially the same as that shown in Figure 6 and consists of the input terminals 48 and 50 and the center tap 49. The rectifier bridge 82 is energized by frequency supplied by frequency divider No. 2 from terminals 52 and 53, and the adjustable resistor 83 is used to adjust the direct current to the desired value.

The advantages of the circuit of Figure 7 over that of Figure 6 arise chiefly from the use of the same windings for all of the magnetizing currents on the cores. This double use of the winding means that the resistance is lowered for each of the magnetizing currents and the losses are consequenty reduced to a fraction of the losses obtained in the circuit of Figure 6. The saturable cores 97 and 98 in Figure 7 take the place of the three-legged saturable core 84 in Figure 6, and the saturable cores 99 and 100 in Figure 7 take the place of the three-legged saturable core 85 in Figure 6.

The four saturable magnetic flux paths in Figure 7 are provided by the four cores 97, 98, 99 and 100. These cores are magnetized by the three magnetizing components as explained in connection with Figure 6. In the core 97 the three components are all positive, in the core 98 the component provided by the frequency divider No. 1 is negative while the other two components are positive. In the core 99 the unidirectional component is negative while the other two components are positive, and in the core 100 the unidirectional component and the component from the frequency divider No. 1 are negative while the other component is positive.

As in Figure 6, the output circuit is energized by the summation of the desired modulation products which reverse in polarity with a reversal of any one of the magnetizing components of the saturable cores. The undesired frequencies, which are in general those frequencies whose polarity is independent of one or more of the magnetizing components, are substantially cancelled out of the output network comprising the inductance 116 and the capacitors 109 and 115.

The cancellation of the undesired components by the double-balanced construction produces an advantage in the ease in which a smooth output voltage wave is obtained and greatly increases the efficiency of operation because of the elmination of the need for elaborate filtering. An equally important advantage is obtained by the elimination of the filter elements because the filters would introduce reactance and resistance at the various frequencies. The introduction of reactances and resistances at the frequencies of the various modulation products may make it possible for the circuit to produce oscillations in the manner of the Heegner oscillator which has been previously discussed. Obviously, any uncontrolled oscillations would be highly undesirable in the operation of the modulator.

In the arrangements shown in Figure 6 and Figure 7, the undesired modulation products work into either an open circuit as produced by an opposing equal voltage, or a substantial short circuit provided by the windings of the frequency dividers. Even though the frequency dividers may have an appreciable internal impedance, nevertheless, an effective short circuit is provided because there is always a cancelling component in another portion of the winding of the frequency divider. Thus, the input from frequency divider No. 2 has the two branches, the one between terminals 48 and 49 and the other between terminals 49 and 50, and the components fed back through terminals 48 and 49 substantially cancel the components fed back through terminals 49 and 50 in the windings of the frequency divider, so that no voltage of the modulation product frequency is produced across the output of the frequency divider. This then, represents a substantial short circuit to the modulation product.

By the elimination of the various filters usually associated with magnetic modulators, the circuits of Figures 6 and 7 provide not only high efficiency as previously mentioned, but also an extremely high degree of stability, and will tolerate wide variations in the load conditions or in the applied voltages without producing any frequency other than the frequency for which the circuit is designed. This extremely high degree of stability also makes it possible, as in Figure 6, to use the inductance 116 in Figure 7 as a regulating reactor. The inductance 116 may be operated at a very high flux density so that the magnetizing current it draws increases at high voltage and stabilizes the output voltage of the modulator.

It will be recognized that this combination of one or more frequency dividers with a double-balanced magnetic modulator is a novel feature which may be applied to purposes other than the generation of telephone ringing frequencies. The conversion efficiency in this arrangement is unusually high for devices of this type and compares favorably with that which can be obtained from a motor-generator set adapted to the conversion of frequencies of the same order of magnitude and in the same power rating. The particular combination described herein provides a frequency at the output of the modulator which is equal to ⅚ of the frequency supplied by the alternating current source. This arrangement can be used for the production of 50 cycle current from a 60 cycle source. Furthermore, if a 50 cycle source and a 60 cycle source are coupled together by means of converter of the type shown, the power may be caused to flow in either direction, even though the device as shown is not designed for the production of 60 cycle current from a 50 cycle source.

The combination of a frequency divider with a double-balanced magnetic modulator as disclosed in my invention may be applied in circuits other than the particular examples shown herein. The modulator may also be energized from one of the frequency dividers and from the source 10 instead of from both frequency dividers in order to obtain different output frequencies. The output frequency of the modulator may then be either greater or less than the source frequency, but will be a rational fraction of the source frequency.

The specific circuits shown for the various components have also been given merely by way of example and are capable of wide modification within the scope of my invention. The frequency divider No. 1 as diagrammed in Figure 2 may be replaced by a frequency divider which requires a relay to start its oscillations, such as shown in U. S. Patent No. 2,088,618, issued August 3, 1937 to C. P. Stocker, or my U. S. Patent 2,384,171, issued September 4, 1945. It may also be replaced by a frequency changer such as that shown in my U. S. Patent 2,418,641, issued April 8, 1947. The arrangement shown in Figure 1 of the last mentioned patent may in fact be used to replace both the frequency divider No. 1 and the frequency doubler, inasmuch as it is capable of supplying output frequencies of both ⅓ and ⅔ the input frequency.

Likewise, numerous modifications of the frequency divider No. 2 are possible. For example, it may be replaced by a frequency divider such as that shown in my U. S. Patent 2,418,640, issued April 8, 1947, or 2,424,236, issued July 22, 1947.

Furthermore, the frequencies indicated on Figure 1 have been shown merely by way of example. Thus, the frequency divider No. 1 could be constructed to supply an output frequency other than $f/3$ and the frequency divider No. 2 could be constructed to supply an output frequency other than $f/2$. Frequency dividers for supplying these other fractions of the input frequency are described in some of my patents previously enumerated herein.

Although I have described my invention with a certain degree of particularity by reference to specific examples, it is understood that the present disclosure has been made only by way of example and that numerous changes in the details of construction and the combination and arrangement of parts may be resorted to without departing from the spirit and the scope of my invention as hereinafter claimed.

I claim as the invention:

1. A frequency converter adapted to be energized by a source of alternating current and to supply outputs at four frequencies different from the frequency of said source, comprising, in combination, a first magnetic frequency reducer adapted to be energized by said source and adapted to supply an output frequency equal to one-third the source frequency, a second magnetic frequency reducer adapted to be energized by said source and adapted to supply an output frequency equal to one-half the source frequency, a magnetic frequency doubler adapted to be energized from said first frequency reducer to supply an output frequency equal to two-thirds the source frequency, and a magnetic modulator adapted to be energized from said first and second frequency reducers and adapted to supply an output frequency equal to five-sixths the source frequency.

2. In combination, first and second magnetic frequency reducers adapted to be energized by a source of alternating current, said first reducer being adapted to generate a frequency equal to one-third the source frequency, said second reducer being adapted to generate a frequency equal to one-half the source frequency, and a biased-core magnetic modulator adapted to be energized from said first and second frequency reducers and adapted to supply an output frequency equal to five-sixths the source frequency.

3. In combination, first and second magnetic frequency reducers adapted to be energized by a source of alternating current, said first reducer being adapted to generate a frequency equal to one-third the source frequency, said second reducer being adapted to generate a frequency equal to one-half the source frequency, and a biased-core magnetic modulator adapted to be energized from said first and second frequency reducers and adapted to supply an output frequency equal to five-sixths the source frequency, said modulator having first, second, third and fourth saturable magnetic flux paths, each being magnetized by the one-third frequency, the one-half frequency and unidirectional biasing flux, the polarity of one of said magnetizing components being the same in all four paths, the polarity of another of said components being the same in the first and second paths and reversed in the third and fourth paths, the polarity of the third of said components being the same in the first and third paths and reversed in the second and fourth paths, and output means coupled to said four flux paths for supplying output voltage of five-sixths the source frequency.

4. In combination, a frequency divider, a magnetic modulator, and energization means for supplying first, second and third magnetizing components to said magnetic modulator, said energization means including said frequency divider, said first magnetizing component being a unidirectional component, said magnetic modulator comprising first, second, third and fourth magnetic flux paths with winding means associated therewith, said first flux path being magnetized by said three components in positive polarity, said second flux path being magnetized by the first and third components in positive polarity and the second component in negative polarity, the third flux path being magnetized by the first component in negative polarity and the second and third in positive polarity and the fourth flux path being magnetized by the first and second components in negative polarity, and the third component in positive polarity, and an output circuit energized from the winding means on said modulator, said output circuit being adapted to receive additive components of a frequency equal to the sum of the frequencies of the second and third magnetizing components.

5. In combination, a frequency reducer, a magnetic modulator, and energization means for supplying first, second and third magnetizig components to said magnetic modulator, said energization means including said frequency divider, said first magnetizing component being a unidirectional component, said magnetic modulator comprising first, second, third and fourth magnetic flux paths with winding means associated therewith, said first flux path being magnetized by said three components in positive polarity, said second flux path being magnetized by the first and third components in positive polarity and the second component in negative polarity, the third flux being magnetized by the first component in negative polarity and the second and third components in positive polarity and the fourth flux path being magnetized by the first and second components in negative polarity, and the third component in positive polarity, and an output circuit energized from the windings on said modulator, said output circuit being adapted to receive additive components of a frequency which is a modulation product of the second and third magnetizing components.

6. In combination, first and second magnetic frequency reducers adapted to be energized by a source of alternating current, said first and second frequency reducers being adapted to supply different output frequencies which are fractions of the frequency of said source, and a biased-core magnetic modulator adapted to be energized from said first and second frequency reducers and adapted to supply an output frequency equal to the sum of the output frequencies of said first and second frequency reducers.

7. In combination, first and second magnetic frequency reducers adapted to be energized by a source of alternating current, said first and second frequency reducers being adapted to generate different frequencies, each of which is a fraction of the source frequency, a magnetic modulator energized by the outputs of said first and second frequency reducers, and an output circuit adapted to be energized from said magnetic modulator with an output frequency which is equal to a modulation product of the output frequencies of said first and second frequency reducers.

8. In combination, a magnetic modulator having first, second, third and fourth saturable magnetic flux paths, means for applying first, second and third magnetizing components to said flux paths, said first component being a unidirectional component, applied with positive polarity to the first and second flux paths and with negative polarity to the third and fourth flux paths, said second magnetizing component being applied with positive polarity to the first and third flux paths and with negative polarity to the second and fourth flux paths, and the third magnetizing component being applied with positive polarity to all of said flux paths, an output circuit coupled to said four flux paths and adapted to receive additive components of the output frequency which is a modulation product of the second and third magnetizing components, said means for applying the magnetizing components to said flux paths including a source of alternating current and a magnetic frequency changer energized from said source.

9. In combination, first and second frequency dividers adapted to be energized by a source of alternating current, said second frequency divider having a winding with a center tap, first and second magnetic modulators each adapted to be energized from both said first and said second frequency dividers, each of said modulators having an input branch and an output branch, the input branches being connected in series and energized from said winding on the second frequency divider, a source of direct current connected between the center tap of said winding and the junction between the first and second modulators, a load circuit, the output branches of said first and second modulators being energized from said first frequency divider through said load circuit, the current flow from said first frequency divider supplied to the first modulator being substantially equal and opposite in the load circuit to that supplied to the second modulator.

10. In combination, first and second bridge-connected magnetic modulators, each having an input branch and an output branch, first, second and third current source means for supplying respectively first, second and third magnetizing components to said magnetic modulators, the input branches of said modulators being connected in series with each other and connected to the first source, said first source having a center tap connection, the second source being connected between said center tap and the junction between the input branches of the first and second modulators, said third source having first and second substantially equal insulated windings, the output branch of the first modulator being supplied from the first winding and the output branch of the second modulator from the second winding, an output transformer having first and second insulated windings, the first winding being connected in series with the first winding of the third source and the second winding being connected in series with the second winding of the third source, the windings on said output transformer being polarized to substantially cancel voltage of the frequency of the third magnetizing component.

11. In combination, first and second magnetic frequency dividers adapted to be energized from a source of alternating current, a magnetic modulator energized from the first and second frequency dividers, and an output circuit energized from said modulator with a frequency equal to the sum of the output frequencies of the first and second frequency dividers.

12. In combination, a magnetic frequency divider, a magnetic frequency multiplier, means for energizing said frequency divider from a source of alternating current, and means for energizing said frequency multiplier from said frequency divider, said frequency divider being adapted to supply to said frequency multiplier a frequency which is equal to the frequency of said source divided by a first integer, said frequency multiplier being adapted to multiply by a second integer the frequency supplied to it, said second integer being different from the first integer.

13. In combination, first and second magnetic modulators each having an input branch and an output branch, the output branch of each being in conjugate relationship to the input branch, first, second and third current source means, said first current source means having an output winding with a center tap, the input branches of said modulators being connected in series between the ends of said output winding, the second current source means being connected between said center tap and the junction between the input branches of the first and second modulators, the third current source means being connected to the output branches of said modulators, and an output circuit energized from the output branches of said modulators with additive voltages of a modulation product and with substantially cancelling voltages of the frequency of said third current source means.

14. In combination, first and second magnetic modulators each having an input branch and an output branch, the output branch of each being in conjugate relationship to the input branch, first, second and third current source means, means for energizing the input branches of said modulators from said first and second current source means, the relative polarities of the first and second current sources being reversed between the two modulators, an output transformer, means for energizing the output branches of the first and second modulators from said third current source through said output transformer, said output transformer receiving substantially cancelling components of current from said third current source means and additive components of modulation product current from said modulators.

HENRY M. HUGE.

No references cited.